April 6, 1948.  J. A. BAKER  2,439,122
POLE GIN
Filed Oct. 30, 1946
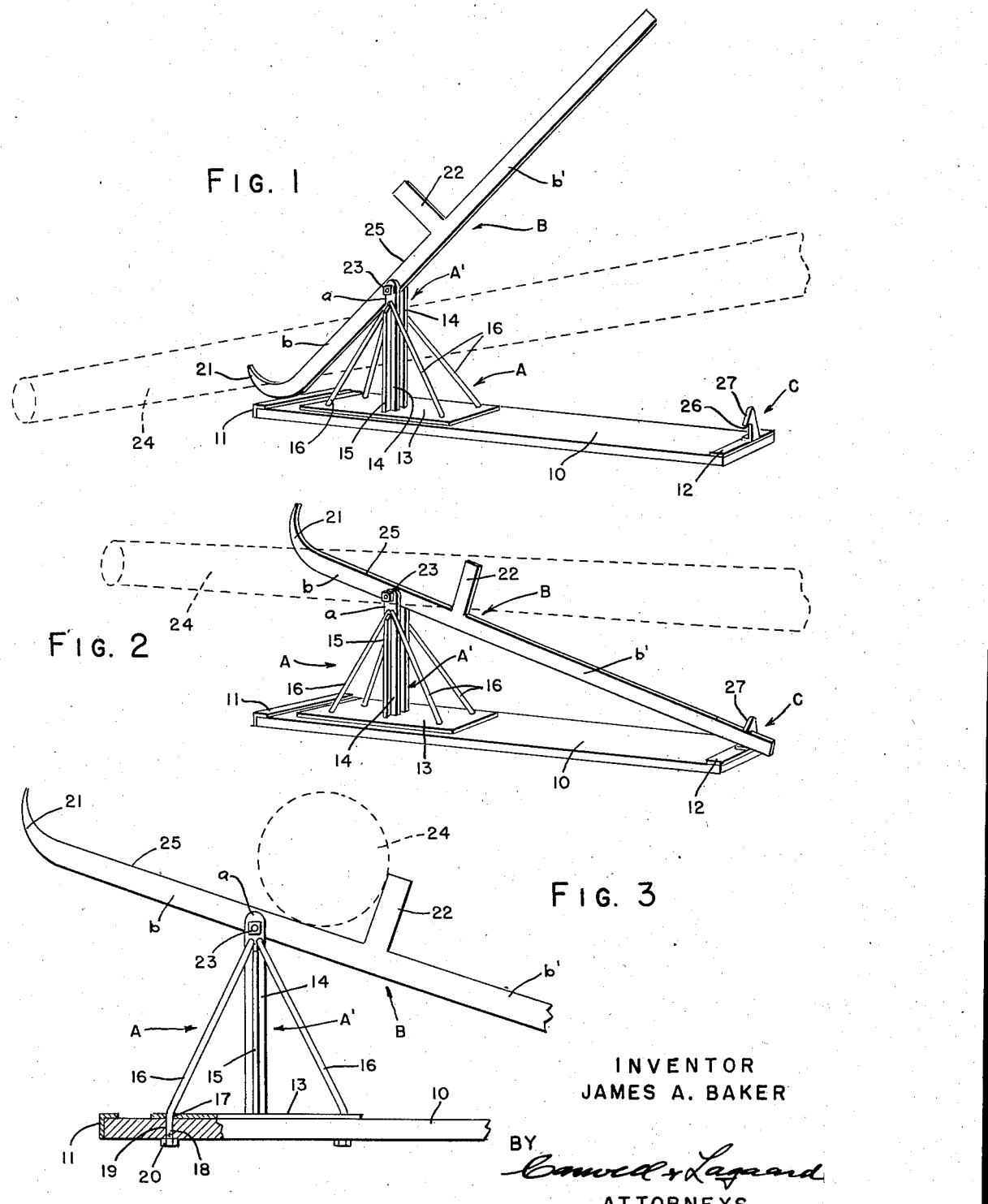
INVENTOR
JAMES A. BAKER
BY
ATTORNEYS Patented Apr. 6, 1948

2,439,122

UNITED STATES PATENT OFFICE 2,439,122

POLE GIN

James A. Baker, Rushford, Minn., assignor of one-half to Earl Kjos, Lanesboro, Minn.

Application October 30, 1946, Serial No. 706,603

5 Claims. (Cl. 214—1)

My invention relates to improvements in pole gins and has for an object thereof to provide a simple, durable, safe, and compact hoisting device which is light in weight and readily transported, and which may be easily operated by one man to lift a pole from the ground and securely hold it in an elevated position conveniently accessible to workmen standing on the ground.

More particularly, it is an object of my invention to provide a device, as above, for use in lifting and holding elevated the ends of power-line poles distributed along the ground at sites where they are ultimately to be planted, whereby linemen working on the ground may conveniently apply to the poles various accessories such as cross-arms, braces, bolts, insulators and the like.

Other objects of the invention reside in the novel combination and arrangement of parts and in the details of construction hereinafter illustrated and/or described.

In the drawings: Fig. 1 is a perspective view of a device constructed in accordance with my invention and showing the same adjusted to pick up the end of a pole; Fig. 2 is a perspective view illustrating the structure shown in Fig. 1 adjusted to hold the lifted pole elevated; and, Fig. 3 is a fragmentary elevational view of said structure adjusted as shown in Fig. 2.

Reference being had to the illustrated form of my invention, it will be seen that the same includes an elongated platform 10, a standard A thereon, and a lever B fulcrumed on said standard.

Preferably, the platform 10 consists of a board of hardwood reinforced across its forward end with an angle iron 11 and across its rear end with an iron strap 12.

The standard A consists of a metallic base-plate 13 of rectangular formation resting on the platform 10 near the forward end thereof. Rising from the center of said base-plate 13 is a post A' including companion members $a$ in the form of T-irons arranged with their webs 14 facing each other in relatively spaced vertical planes extending longitudinally of said platform 10, and with their flanges 15 extending outwardly in opposition to each other transversely of said platform 10. Each of said flanges 15 is foreshortened at the head of its respective post member $a$, such member being welded at its lower end to the base-plate 13. A pair of oppositely biased brace-rods 16 are supplied for each post member $a$, each brace-rod being welded at its upper end to its respective post member. The lower end of each brace-rod 16 extends through an aperture 17 in the base-plate 13 near a corner thereof. Each brace-rod 16 is welded to said base-plate and has a terminal anchoring portion 18 depending therefrom and threaded at its extremity. Said terminal portions 18 of said brace-rods 16 extend through apertures 19 in the platform 10 and are fitted with nuts 20 which are turned against the bottom of said platform to clamp the base-plate 13 against the top thereof.

The lever B consists of a bar which is disposed edgewise between the webs 14 of the post members $a$ at the heads thereof. This lever B includes a forward work-engaging portion $b$ and a rear handle portion $b'$ for tilting the lever. Said work-engaging portion $b$ of said lever is forwardly tipped with an upturned hook 21 and at the rear thereof is an upstanding pole-abutment 22. A pivot-bolt 23, fulcruming the lever B to the standard A, extends through the work-engaging portion $b$ of said lever intermediately thereof and through the heads of the post members $a$, the distance between the pivot-bolt 23 and the pole-abutment 22 to the rear thereof, being substantially the same as the diameters of poles of the type to be handled by the device.

The angle-iron 11 reinforcing the forward end of the platform 10 and the strap-iron 12 reinforcing the rear end of said platform function as striker-members which constitute low-limit stops for the forward and rear ends, respectively, of the lever B.

In use, the device is placed adjacent to a pole 24, as shown in Fig. 1, in a manner to catch the hooked tip 21 of the lever B beneath the pole somewhat removed from the end thereof to which accessories are to be applied. The handle portion $b'$ of the lever B is then forced down against the stop-strap 12 at the rear of the platform 10.

As the handle portion $b'$ of the lever B is thus depressed, the pole 24, first caught by the hooked tip 21 of said lever, is elevated and thence rolls or slides rearwardly on the upper edge 25 of the work-engaging portion $b$ of said lever passing over the top of the standard A and back to position against the pole-abutment 22 to the rear of the pivot-bolt 23. With the pole 24 thus positioned on the lever B, a part of the weight of said pole operates to hold down the handle portion $b'$ of said lever against the platform 10 and thereby maintain the device in adjustment presenting the elevated end of the pole in a raised position readily accessible to workmen standing on the ground.

To enable a pole to roll or slide along the tilting lever B over the top of the standard A into a position rearwardly of the fulcrum point, said upper edge 25 of the working portion b is elevated relative to the uppermost portions of the heads of the post members a. This feature, of course, is an important one in the instant device.

As a safety measure guarding against the accidental lowering of a pole by workmen turning the same in its elevated position, I provide a catch C for releasably locking the handle portion b' of the lever B in its depressed position (Fig. 2). This catch C is located on the stop-strap 12 in position upstanding therefrom and is formed with a shoulder 26 beneath which said handle portion b' of said lever B engages as it strikes said stop-strap 12. To render the handle portion b' of the lever B self-engageable with the catch C, said catch is formed with a biased edge 27 which functions as a cam surface and against which the descending handle portion b' rides to flex the same laterally and set up tension therein to cause said handle portion b' to spring back sidewise beneath said shoulder 26 when it reaches the stop-strap 12.

Upon adjusting the device to lower a pole from its elevated position, the handle portion b' of the lever B is flexed laterally away from the catch C to release it from engagement beneath the shoulder 26, whereupon, said handle portion b' is free to be swung upwardly toward and into its elevated position (Fig. 1), whereupon the pole slides down the supporting edge 25 of the work engaging portion b of said lever, forwardly from the pole-abutment 22 and over the top of the standard A to the hooked tip 21 from which the then lowered pole is readily released.

Changes in the specific form of my invention, as herein described, may be made within the scope of what is claimed without departing from the spirit of my invention.

Having described my invention, what I claim as new and desire to protect by Letters Patent is:

1. A device for lifting one end of a pole from the ground, holding the same elevated and lowering it to the ground, said device comprising a platform, a standard thereon, a lever including a forward work-engaging portion and a rearward handle portion for tilting the lever, said work-engaging portion of said lever having an upstanding pole-abutment at the rear thereof, pivot means fulcruming the lever on said standard at a point intermediately of the work-engaging portion of said lever between its forward tip and said pole-abutment thereon, said work-engaging portion of the lever having an upper surface adapted to support a pole, upon the tilting of the lever, for movement along the lever back and forth above the top of the standard from said tip of said work-engaging portion to position against said pole-abutment rearwardly of the fulcrum of said lever.

2. A device for lifting one end of a pole from the ground, holding the same elevated and lowering it to the ground, said device comprising a platform, a standard thereon, a lever including a forward work-engaging portion and a rearward handle portion for tilting the lever, said work-engaging portion of said lever having an upstanding pole-abutment at the rear thereof, pivot means fulcruming the lever on said standard at a point intermediately of the work-engaging portion of said lever between its forward tip and said pole-abutment thereon, said work-engaging portion of the lever having an upper surface adapted to support a pole, upon the tilting of the lever, for movement along the lever back and forth above the top of the standard from said tip of said work-engaging portion to position against said pole-abutment rearwardly of the fulcrum of said lever, said platform at the rear thereof providing a low-limit stop for the rear end of said lever, and catch-means on said platform for releasably holding the depressed rear end of said lever against said stop.

3. A device for lifting one end of a pole from the ground, holding the same elevated and lowering it to the ground, said device comprising a platform, a standard thereon, a lever including a forward work-engaging portion and a rearward handle portion for tilting the lever, said work-engaging portion of said lever being upwardly hooked at its forward tip and having an upstanding pole-abutment at the rear thereof, pivot means fulcruming the lever on said standard at a point intermediately of the work-engaging portion of said lever between its hooked tip and said pole-abutment thereon, said work-engaging portion of the lever having an upper surface serving to support a pole, upon the tilting of the lever, for movement along the lever back and forth above the top of the standard from said tip of said work-engaging portion to position against said pole-abutment rearwardly of the fulcrum of said lever, said platform at front and rear thereof providing low limit stops for the forward and rear ends, respectively, of said lever.

4. A device for lifting one end of a pole from the ground, holding the same elevated and lowering it to the ground, said device comprising a platform, a standard thereon, a lever including a forward work-engaging portion and a rearward handle portion for tilting the lever, said work-engaging portion of said lever having an upstanding pole-abutment at the rear thereof, pivot means fulcruming the lever on said standard at a point intermediately of the work-engaging portion of said lever between its forward tip and said pole-abutment thereon, said work-engaging portion of the lever having an upper surface adapted to support a pole, upon the tilting of the lever, for movement along the lever back and forth above the top of the standard from said tip of said work-engaging portion to position against said pole-abutment rearwardly of the fulcrum of said lever, and catch-means on the platform for engaging the lever releasably to secure the same in pole-holding position with the rear end of said lever depressed.

5. A pole gin comprising a platform, a standard thereon, a lever having a forward work-engaging portion and a rear handle portion, said standard consisting of a base-plate, a post secured at its base to said base-plate, and brace-rods secured at their upper ends to the post and secured near their lower ends to said base-plate, the lower terminal portions of said brace-rods depending from said base-plate and extending through said platform to anchor said standard thereon, and pivot means fulcruming said lever on said post.

JAMES A. BAKER.